US007431065B2

(12) United States Patent
Silverbrook

(10) Patent No.: US 7,431,065 B2
(45) Date of Patent: Oct. 7, 2008

(54) PRINTING ARRANGEMENT WITH STATIONS FOR PRODUCING A PRINTED, BOUND DOCUMENT

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 11/635,489

(22) Filed: Dec. 8, 2006

(65) Prior Publication Data

US 2007/0081066 A1 Apr. 12, 2007

Related U.S. Application Data

(63) Continuation of application No. 11/172,839, filed on Jul. 5, 2005, now Pat. No. 7,152,860, which is a continuation of application No. 10/968,923, filed on Oct. 21, 2004, now Pat. No. 6,957,811, which is a continuation of application No. 10/728,782, filed on Dec. 8, 2003, now Pat. No. 6,840,512, which is a continuation of application No. 10/309,224, filed on Dec. 4, 2002, now Pat. No. 6,672,584, which is a continuation of application No. 09/721,859, filed on Nov. 25, 2000, now Pat. No. 6,631,897.

(30) Foreign Application Priority Data

Feb. 20, 2000 (AU) .................................... PR1573

(51) Int. Cl.
*B32B 38/14* (2006.01)
*B32B 39/00* (2006.01)

(52) U.S. Cl. ...................................................... 156/384

(58) Field of Classification Search ................. 156/277, 156/291, 356, 358, 362, 384, 387, 580, 581, 156/582, 583.6
See application file for complete search history.

(56) References Cited

U.S. PATENT DOCUMENTS

| | | | |
|---|---|---|---|
| 2,573,612 | A | 10/1951 | Scheinker |
| 2,650,109 | A | 8/1953 | Johnson |
| 2,707,632 | A | 5/1955 | Daneke |
| 3,146,473 | A | 9/1964 | Hoff |
| 3,159,399 | A | 12/1964 | Davis, Jr. |
| 3,222,060 | A | 12/1965 | Svantesson |
| 3,252,703 | A | 5/1966 | Peugnet |
| 3,391,929 | A | 7/1968 | Blair |

(Continued)

FOREIGN PATENT DOCUMENTS

DE 2942965 A 5/1981

(Continued)

OTHER PUBLICATIONS

English Abstract of JP 01-271368 to Kaneko.*

*Primary Examiner*—Philip C Tucker
*Assistant Examiner*—Sing P Chan

(57) ABSTRACT

A printing arrangement includes a driving station which is configured to drive print media along a path. A printing station is operatively arranged with respect to the path to print upon the print media. An adhesive application station is operatively arranged with respect to the path to apply adhesive to the print media. A binding station is provided in which the printed print media can collect in a stack and be pressed together to facilitate adhering of the print media together.

8 Claims, 9 Drawing Sheets

U.S. PATENT DOCUMENTS

| | | | | |
|---|---|---|---|---|
| 3,460,173 | A | | 8/1969 | Stuertz |
| 3,498,601 | A | | 3/1970 | Koval |
| 3,559,984 | A | | 2/1971 | Westra |
| 3,842,995 | A | | 10/1974 | Dooley |
| 3,862,752 | A | | 1/1975 | Totten |
| 4,344,727 | A | | 8/1982 | Chaloupka |
| 5,245,897 | A | * | 9/1993 | Arnold et al. .................. 83/56 |
| 5,429,475 | A | | 7/1995 | Mohr |
| 5,456,539 | A | * | 10/1995 | Wright et al. ................. 400/82 |
| 5,501,560 | A | * | 3/1996 | Blume ......................... 412/37 |
| 5,601,389 | A | | 2/1997 | Minami |
| 5,632,587 | A | | 5/1997 | Coyette |
| 6,622,999 | B1 | | 9/2003 | King et al. |
| 6,631,897 | B1 | | 10/2003 | Silverbrook |
| 6,672,584 | B2 | | 1/2004 | Silverbrook |
| 6,840,512 | B2 | | 1/2005 | Silverbrook |
| 6,845,978 | B2 | | 1/2005 | Silverbrook |
| 6,848,687 | B2 | | 2/2005 | Silverbrook |
| 6,860,479 | B2 | | 3/2005 | Silverbrook |
| 6,863,105 | B2 | | 3/2005 | Silverbrook |
| 6,957,811 | B2 | | 10/2005 | Silverbrook |
| 6,978,990 | B2 | | 12/2005 | Silverbrook |

FOREIGN PATENT DOCUMENTS

| | | | | |
|---|---|---|---|---|
| GB | 2303580 | A1 | | 2/1997 |
| JP | 01271368 | A | * | 10/1989 |

* cited by examiner

PRINTING ARRANGEMENT WITH STATIONS FOR PRODUCING A PRINTED, BOUND DOCUMENT

CROSS REFERENCE TO RELATED APPLICATIONS

The present application is a Continuation of U.S. application Ser. No. 11/172,839 filed Jul. 5, 2005, now U.S. Pat. No. 7,152,860 which is a Continuation of U.S. application Ser. No. 10/968,923, filed Oct. 21, 2004, now issued as U.S. Pat. No. 6,957,811, which is a Continuation of U.S. application Ser. No. 10/728,782 filed Dec. 8, 2003, now issued as U.S. Pat. No. 6,840,512 which is a Continuation of U.S. application Ser. No. 10/309,224 filed Dec. 4, 2002, now issued as U.S. Pat. No. 6,672,584 which is a Continuation of U.S. application Ser. No. 09/721,859 filed Nov. 25, 2000, now issued U.S. Pat. No. 6,631,897 all of which are herein incorporated by reference.

FIELD OF THE INVENTION

The following invention relates to a page binding device having a support tray with vibratory page alignment. More particularly, though not exclusively, the invention relates to a page binder that applies glue to pages and feeds them to the support tray at relatively high velocities. The support tray receives the pre-edge glued, uniformly sized printed pages and aligns them prior to pressing the pre-glued edges together.

It is well known to print individual pages of a volume to be bound, then to place all of the printed pages into a stack, to then crop one or more edges of the stack and to then bind the pages together by applying a binding adhesive to an edge of the stack of pages. This is a time consuming and labour-intensive process.

It would be more efficient to provide pre-cut, uniformly sized pages, to print one or both surfaces of each page and to provide a strip of binding adhesive to one or both surfaces of each page adjacent the edge to be bound, to accurately place the printed and pre-glued pages in a stack, and to press the pages adjacent the spine so that the adhesive binds the page edges together.

It would also be desirable to provide a page binding device that can apply adhesive and bind pages fed from a printer at relatively high velocity.

OBJECT OF THE INVENTION

It is the object of the invention to provide a page binding device configured for quick and reliable operation.

DISCLOSURE OF THE INVENTION

According to a first aspect, the present invention provides a page binding device for binding printed pages, the device comprising:

a support tray for receiving and stacking printed pages to form a bound document;

an adhesive applicator for applying a two part adhesive to the printed pages, the two part adhesive having a first part and a second part, wherein the first part and the second part must contact each other to form an adhesive bond, the adhesive applicator adapted to apply the first part of the adhesive to one side of the printed pages and the second part of the adhesive is applied to the opposite side of the page; and, a page conveyor for sequentially feeding pages along a paper path from the adhesive applicator to the support tray; wherein during use, the printed pages are stacked in the support tray such that the first part of the adhesive on one page contacts the second part of the adhesive on the adjacent page in the adjacent page in the stack.

Using a two part adhesive allows the adhesive applicator to be easily incorporated into a duplexed printhead assembly. As each side of the duplexed printhead would only eject one part of the two-part adhesive, the nozzle are far less prone to clogging.

In some embodiments, the printhead assembly is a duplexed printhead assembly adapted to print on both sides of a page and the adhesive applicator is integrally incorporated into the duplexed printhead assembly. In a preferred embodiment, the pages are conveyed in a landscape orientation. Preferably the tray has a support surface having one corner that is lower than other portions of the support surface. In a further preferred form, the device has a vibrator interacting with the tray so as to induce vibration therein to assist in alignment of the pages of the stack.

Preferably the tray has at least two side walls extending substantially perpendicularly to each other and against which perpendicular edges of the pages bear for alignment of the pages within the stack.

Preferably vibration of the tray is dampened by dampers.

Preferably the tray is supported by a frame.

Preferably the tray is suspended from the frame.

Preferably the dampers extend from the tray to the frame.

Preferably the vibrator is a subsonic vibrator.

Preferably means are provided to alter a level of the support surface of the tray so as to ensure that an upper page of the stack is situated at a predefined level for interaction with an edge-pressing device.

According to a second aspect, the present invention provides a method of binding pages from a printer into a bound document, the method comprising:

applying a two part adhesive to the printed pages, the two part adhesive having a first part and a second part, wherein the first part and the second part must contact each other to form an adhesive bond, wherein the first part of the adhesive is applied to one side of the printed pages and the second part of the adhesive is applied to the opposite side of the page; and, stacking the pages such that the first part of the adhesive on one page contacts the second part of the adhesive on the adjacent page in the adjacent page in the stack.

BRIEF DESCRIPTION OF THE DRAWINGS

Preferred forms of the present invention will now be described by way of example with reference to the accompanying drawings wherein.

DESCRIPTION OF THE PREFERRED EMBODIMENTS

Figure 1:
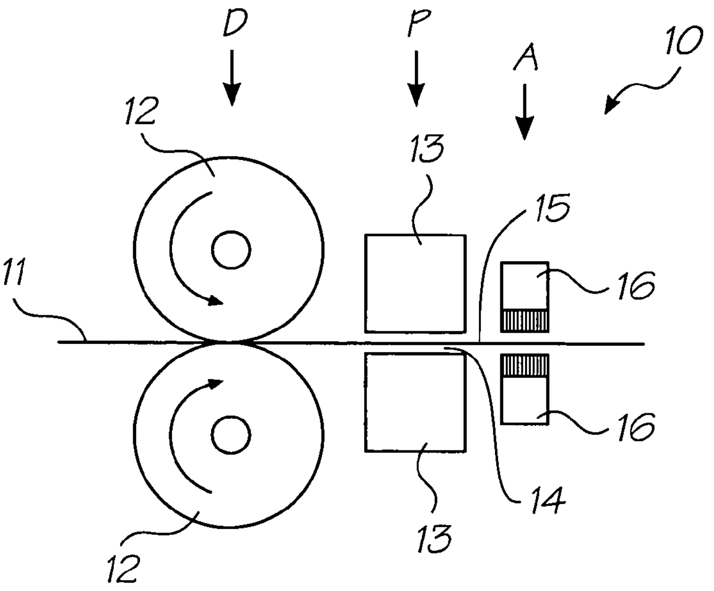
FIG. 1 is a schematic illustration of a page conveyed along a path and passing a pagewidth print head and an adhesive applicator.

In FIG. 1 of the accompanying drawings there is schematically depicted a path 10 of a page 11 passing through a printer incorporating an adhesive applicator.

Page 11 is driven to the right at a driving station D. Driving station D might comprise a pair of opposed pinch rollers 12 as shown. The page 11 then passes a printing station P and then an adhesive application station A. As an alternative, the adhesive application station A might precede the printing station P, but it is preferred that the adhesive application station follow the printing station so that adhesive on the page 11 does not clog the print head or print heads at printing station P.

For single sided page printing, the printing station P might comprise a single print head 13. The print head 13 might be a pagewidth drop on demand ink jet print head. Alternatively, the print head might be that of a laser printer or other printing device. Where the page 11 is to be printed on both sides, a pair of opposed print heads 13 might be provided.

Where the print heads 13 are ink jet print heads, wet ink 15 on page 11 might pass through the adhesive application station A.

An air cushion 14 at either side of the page 11 as it passes printing station P can be provided by means of air passing through an air flow path provided in each print head 13.

The adhesive application station A can comprise an adhesive applicator 16 at one or both sides of the page 11, depending upon which side or sides of the page to which adhesive is to be applied.

Figure 2:
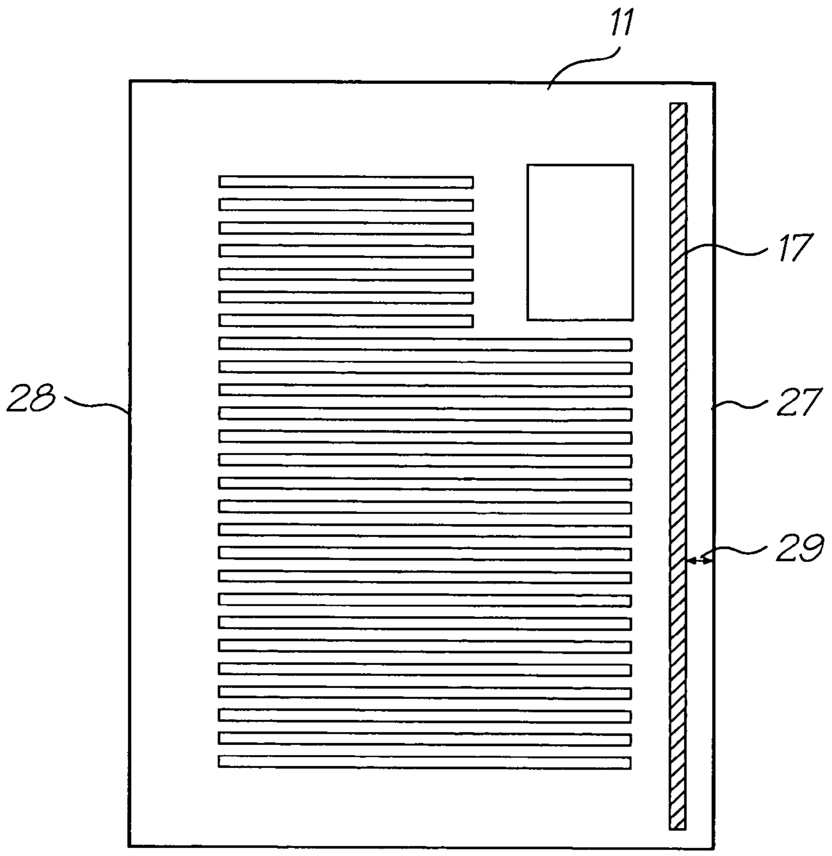
FIG. 2 is a schematic illustration of a page having an adhesive strip adjacent one edge thereof.

As shown in FIG. 2, a page 11 having matter printed thereon by printing station P also includes a strip 17 of adhesive as applied at adhesive application station A.

As can be seen, the strip 17 can be applied adjacent to the leading edge 27 of page 11. The application of strip 17 adjacent to the leading edge 27 is suitable for those situations where the adhesive applicator does not contact the page, or contacts the page at a velocity accurately matching that of the page 11 as it passes the adhesive application station A. Alternatively, the strip 17 could be applied adjacent to the trailing edge 28 of page 11 and this position might be more suited to adhesive applicators that make some form of physical contact with the page 11 as it passes adhesive application station A.

A margin 29 of about 1 to 2.5 mm is desirable between the strip 17 and edge 27 or 28 of page 11.

Figure 3:
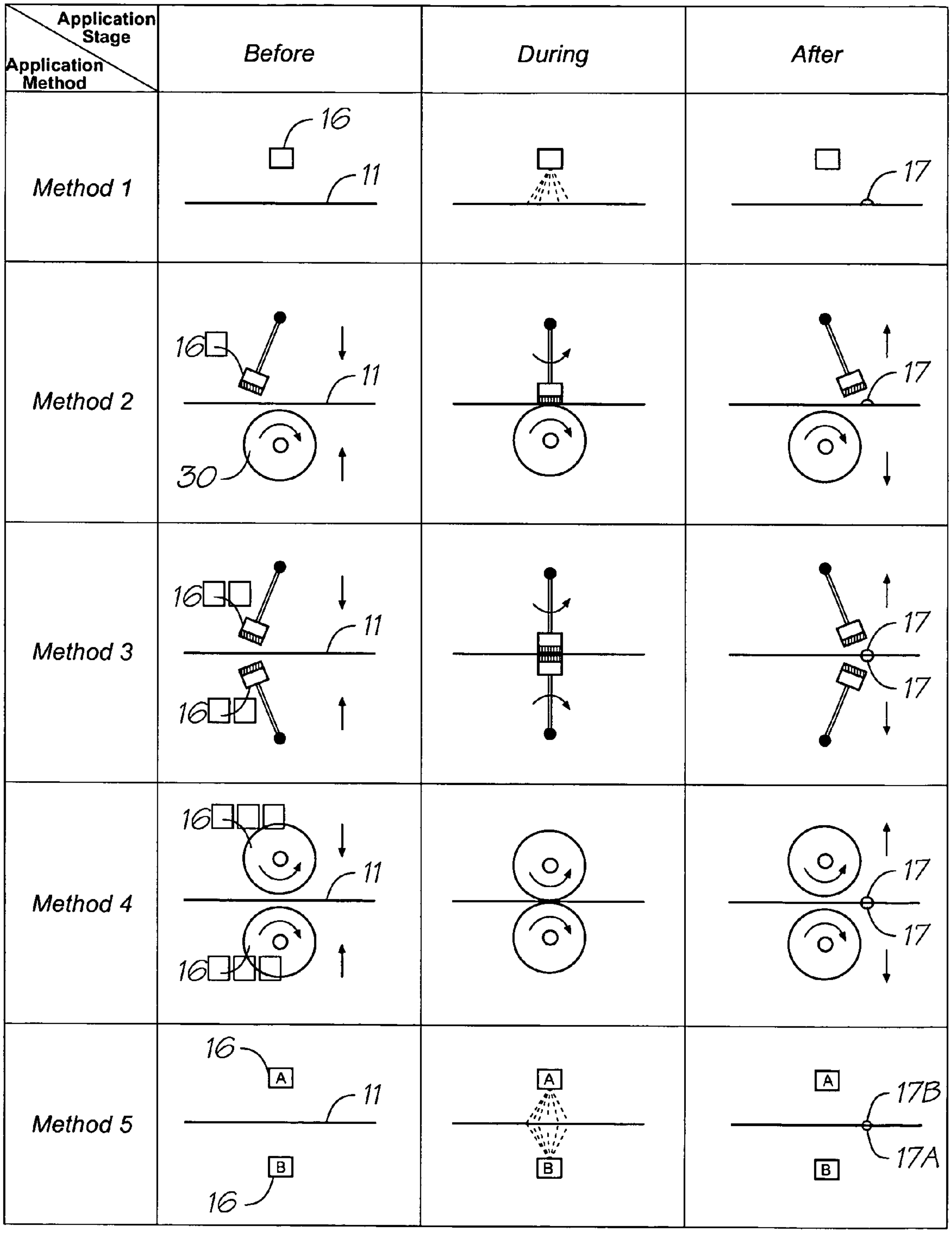
FIG. 3 is a table, schematically illustrating the principles of five alternative adhesive application methods.

Various methods of applying adhesive to the page 11 are envisaged, some of which are schematically depicted in FIG. 3.

Method 1 in FIG. 3 is a non-contact method of applying adhesive to the moving page 11. In this method, a stationary adhesive applicator 16 sprays adhesive on one side of page 11 as it passes the applicator. The adhesive applicator might be formed integrally with the print head 13 or might be located upstream or after the print head.

Method 2 also applies adhesive to one side of the moving page 11, although this time using a contact method. An adhesive applicator 16' is pivotally mounted about a fixed pivot point and is caused to move at a speed matching that at which the page 11 passes through the adhesive application station. A reaction roller 30 comes into contact with the underside of page 11 as the adhesive applicator 16' applies adhesive to the page.

Method 3 applies adhesive to both sides of a page 11 as it passes through the adhesive application station. A pair of pivotally mounted adhesive applicators 16" move pivotally at a speed corresponding with that at which the page 11 passes through the adhesive application station. They both come into contact with the page 11 and mutually counteract each other's force component normal to the page 11.

Method 4 employs a pair of adhesive applicator rollers 16'" spaced from either side of the page 11 until activated to apply adhesive whereupon they move toward and touch the page 11, leaving a strip of adhesive 17 at either side of the page. The rollers would mutually counteract each other's force component normal to page 11.

Method 5 employs a pair of adhesive spray applicators 16'", one at either side of page 11. The applicators do not contact page 11. Each applicator would apply one part of a two-part adhesive to a respective side of page 11 so as to apply strips 17*a* and 17*b*. Like Method 1, Method 5 could employ an adhesive applicator formed integrally with the print head. That is, a channel for the flow of one part of a two-part adhesive might be provided in each print head.

Also, the use of a two-part adhesive could be beneficial in situations where there might be some delay in the printing/binding operation. For example, if there were a computer software or hardware malfunction part-way through a printing/binding operation, the use of a two-part adhesive could provide sufficient time within which to rectify the problem and complete the binding process.

Figure 4:
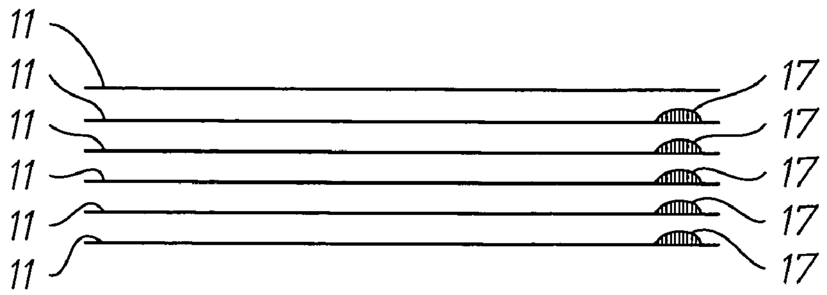
FIG. 4 is a schematic elevational view of a number of pages with all but the top page having a strip of adhesive applied to an upper surface adjacent to an edge to be bound.

FIG. 4 illustrates a stack of pages 11 with all but the top page provided with an adhesive strip 17 at an upper surface adjacent one edge to be bound.

Figure 5:
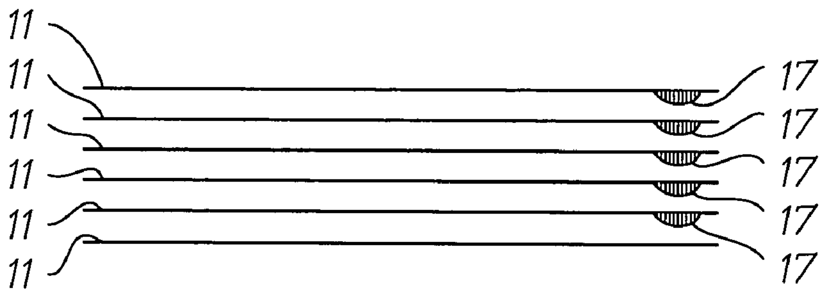
FIG. 5 is a schematic elevational view of a stack of pages with all but the bottom page having a strip of adhesive applied to a lower surface thereof adjacent to an edge to be bound.

An alternative is depicted in FIG. 5 wherein all but the bottom page has an adhesive strip 17 applied to its bottom surface adjacent an edge to be bound.

Figure 6:
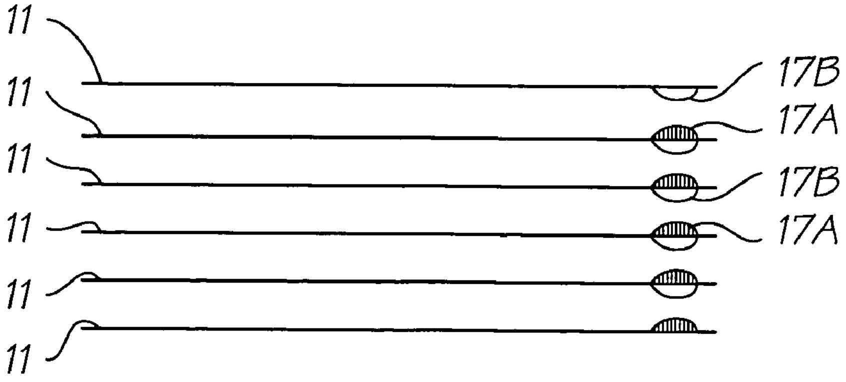
FIG. 6 is a schematic elevational view of a stack of pages with a first part of a two-part adhesive applied to the upper surface of all but the top page and a second part of a two-part adhesive applied to the bottom surface of all but the bottom page.

In FIG. 6, a stack of pages is shown with part A of a two-part adhesive applied to the upper surface of all but the top page and the second part of the two-part adhesive applied to the bottom surface of all but the bottom page.

When the stacks of pages of FIGS. 4 and 5 are pressed together, adhesion of the pages occurs once the adhesive 17 has dried.

When the pages 11 of FIG. 6 are pressed together, the respective parts of the two-part adhesive in strips 17*a* and 17*b* combine so as to react and set.

Where print head 13 is an ink jet print head, and non-contact adhesive application Methods 1 and 5 are employed, the adhesive strip 17 is applied to page 11 before ink on the page passing through the adhesive application station 10 has dried. Air passing through air gap 14 accelerates the drying process. That is, adhesive is applied to the page as it passes out of the print head 13. The velocity of the page 11 does not change as a result of the application of adhesive strip 17.

Where the strip 17 is applied alongside the leading edge 27 of the page 11, any alteration to the velocity of page 11 would adversely affect print quality. Hence application of adhesive strip 17 alongside the leading edge 27 is only possible without adversely affecting print quality using non-contact adhesive application methods or methods where the velocity of the adhesive applicator coming into contact with the page is very close to that of page 11.

Where the adhesive strip 17 is applied alongside the trailing edge 28 of page 11, a non-contact method or method of very close speed matching is also desired. For example, if the speed of the adhesive applicator of Methods 2 to 4 was faster than that at which the page 11 was passing the print head, the page could buckle.

A most desirable embodiment of the present invention would use a two-part adhesive and would incorporate the adhesive applicators within the print heads themselves. That is, a passage or passages for the flow of adhesive through the print head would be space and cost-effective.

The likelihood of adhesive "gumming" and blocking such channels would be diminished where a two-part adhesive was employed. That is, only one part of the two-part adhesive would pass through any particular channel or channels of the print head.

Where respective parts of a two-part adhesive are applied to opposed sides of pages 11, those respective parts could pass through dedicated channels in the respective print head at either side of the page. This would greatly reduce the likelihood of adhesive blockages in the flow channels.

The adhesive or respective parts of a two-part adhesive can be provided in a chamber of a replaceable ink cartridge providing ink to the print head.

The print head 13 should be as close a possible to the pinch rollers 12. This is because the rollers 12 provide a mechanical constraint upon the page 11 to enable accuracy of printing.

Figure 7:
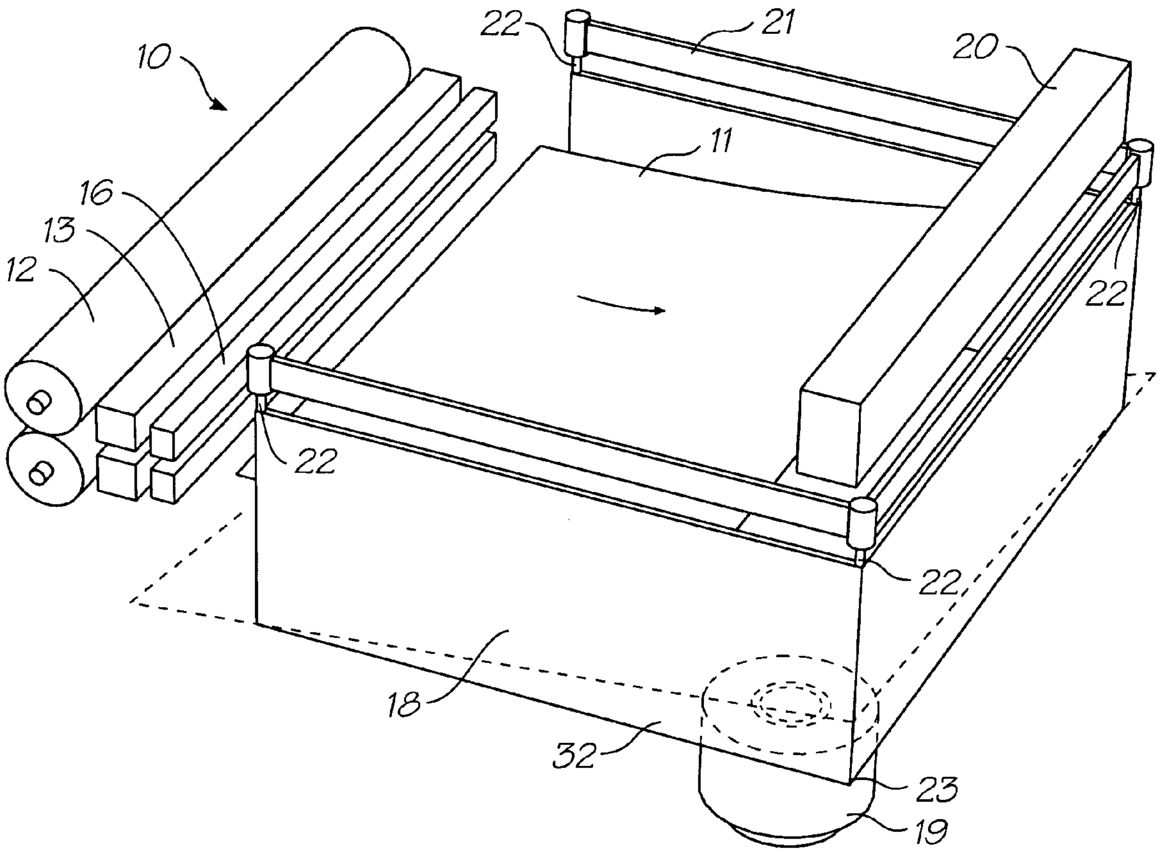
FIG. 7 is a schematic perspective view of a page binding support tray situated immediately down-line of the adhesive applicator.

The pinch rollers 12, print heads 13 and adhesive applicator 16 are illustrated in FIG. 7 alongside a page support tray 18. That is, the page support tray 18 receives pages 11 that exit the paper path 10. The tray 18 is suspended from a frame 21 by means of respective dampers 22 at each corner. The dampers could be elastomeric dampers or small hydraulic or pneumatic cylinders for example. The floor of tray 11 is not level. It has a lower-most corner 23 beneath which there is provided a vibrator 19. The vibrator 19 might be a subsonic vibrator (ie a vibrator having a frequency below 20 hz) or an out-of-balance electric motor for example. A binding press 20 is situated above the tray 18 over the at-rest position of the respective leading edge of the pages 11. However, as an alternative, the binding press 20 could be provided so as to be situated over the trailing edge of the pages.

Figure 8:
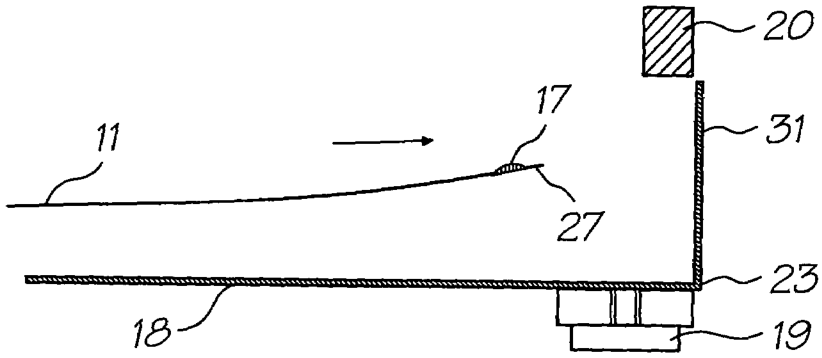
FIG. 8 is a schematic cross-sectional elevational view of the page binding support tray of FIG. 7 showing a first page having a strip of adhesive adjacent its edge at an upper surface en route thereto.
Figure 9:
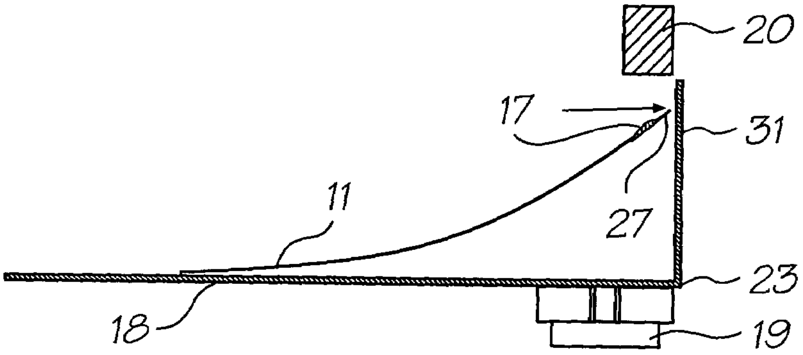
FIG. 9 is a schematic cross-sectional elevational view of the page binding support tray and page of FIG. 8, with the page closer to its rest position.
Figure 10:
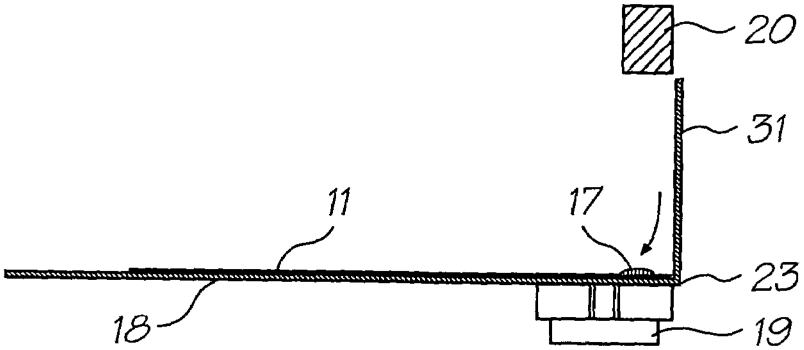
FIG. 10 is a schematic cross-sectional elevational view of the page binding support tray and page of FIGS. 8 and 9, with the page at rest thereon.

In FIG. 8 a first page 11 is shown in its trajectory toward tray 18. Page 11 has a strip of adhesive 17 on its upper surface adjacent the leading edge. The page 11 might tend to catch a pocket of air beneath it as it floats into position and the leading edge 28 might strike the vertical wall 31 as shown in FIG. 9. The vibrations of the tray 18 as a result of the vibrator 19 will cause the page 11 to come to rest with edge 27 alongside the lower edge of wall 31 and with a right angled edge of the page touching the front wall 32 of tray 18.

Figure 11:
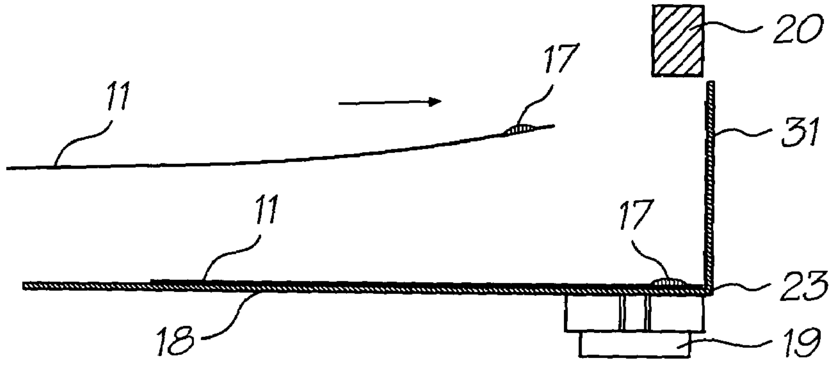
FIGS. 11, 12 and 13 are schematic cross-sectional elevational view of the page binding support tray showing a second page as it progresses to rest upon the first page.
Figure 12:
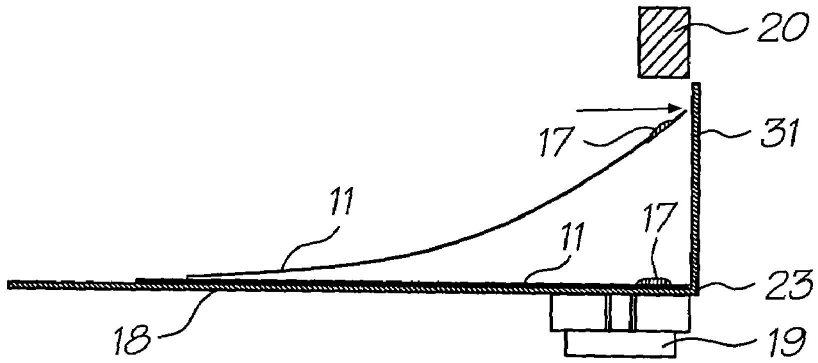
Figure 13:
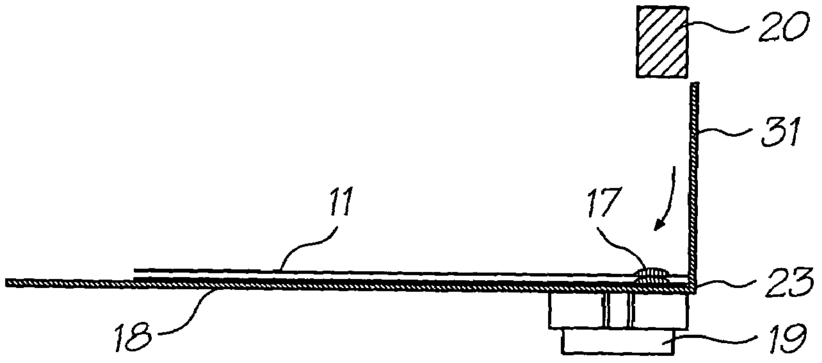
Figure 14:
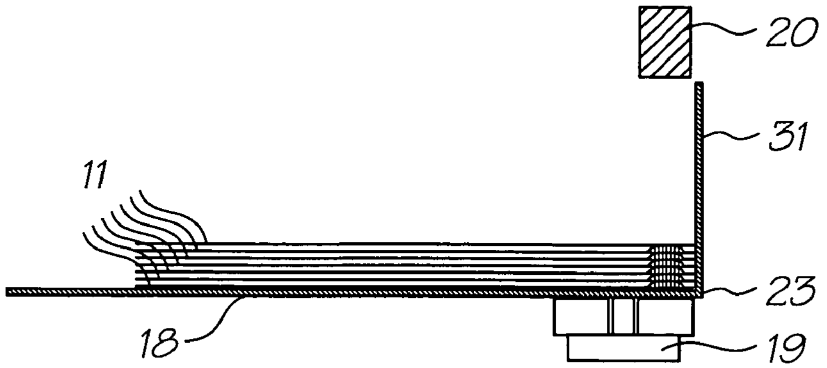
FIG. 14 is a schematic cross-sectional elevational view of the page binding support tray having a number of pages resting thereon to be bound, with all but the top page having an upwardly facing strip of adhesive adjacent an edge thereof.

In FIG. 11, a second page 11 is shown in its trajectory toward tray 18. In a motion similar to that of the first page, the second page comes to rest upon the first page in a position perfectly aligned therewith. The second page comes to rest into the position depicted in FIG. 13. Where the pages have the adhesive strip 17 applied to the upper surface, the final page is provided without any adhesive and it comes to rest at the top of the stack as depicted in FIG. 14. If, instead, the majority of pages 11 had the adhesive strip 17 applied to their bottom surface, the first page (ie the page at the bottom of the stack) would have no adhesive applied to it. This would be suitable for multiple binding compressions.

Figure 15:
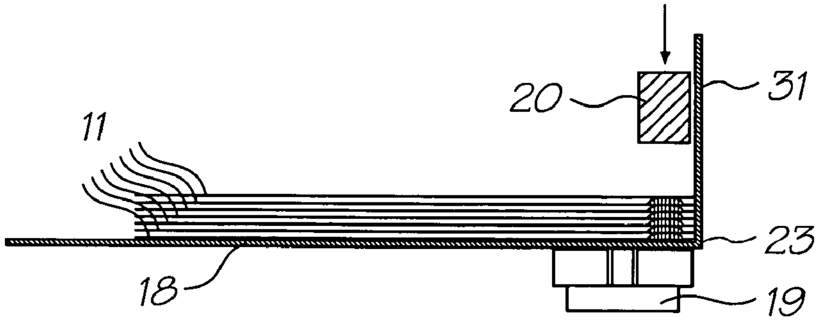
FIG. 15 shows the progression of a page-binding press toward the edge of the stacked pages.
Figure 16:
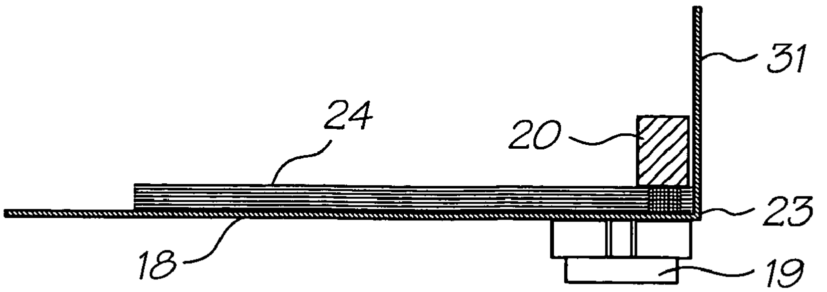
FIG. 16 shows the page binding support tray with pages bound along their edge by application of the binding press.

As shown in FIG. 15, the binding press 20 commences downward movement toward the stack of pages 11 over the aligned adhesive strips 17. The stack is then compressed to a bound volume 24 as shown in FIG. 16.

It should be noted that no subsequent edge trimming of the bound volume is required so long as standard-sized pages 11 had initially been used. This is because the vibrator 19 has aligned the pages into the lower-most corner 23 of tray 18 as described earlier.

Figure 17:
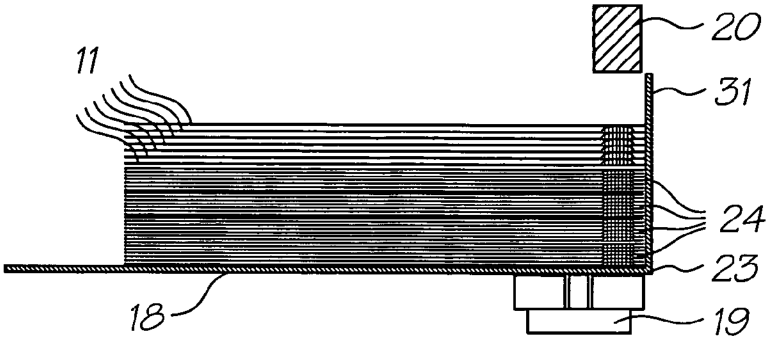
FIG. 17 is a cross-sectional elevational view of the page binding support tray having a number of individual volumes resting thereon, with a top volume ready to be pressed.
Figure 18:
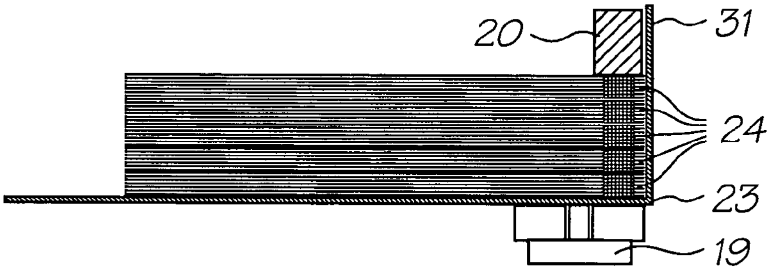
FIG. 18 is a schematic cross-sectional elevational view of the page binding support tray and volumes of FIG. 17, with all volumes having been pressed, one upon another.
Figure 19:
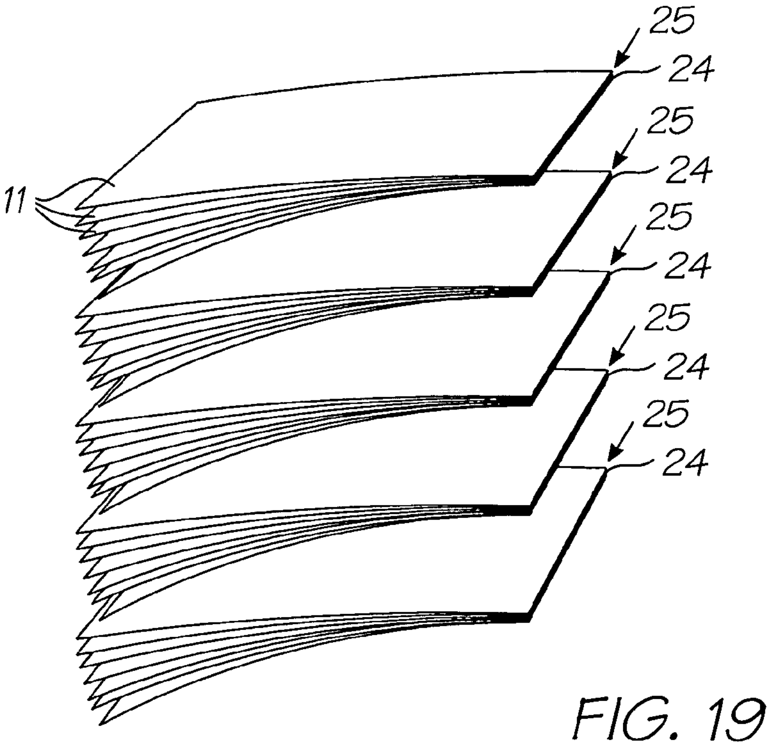
FIG. 19 is a schematic perspective illustration of a number of volumes having been bound.

In FIGS. 17 and 18, multiple volume 24 are shown stacked on upon another with the upper-most volumes being progressively compressed by repeated application of press 20.

Figure 20:
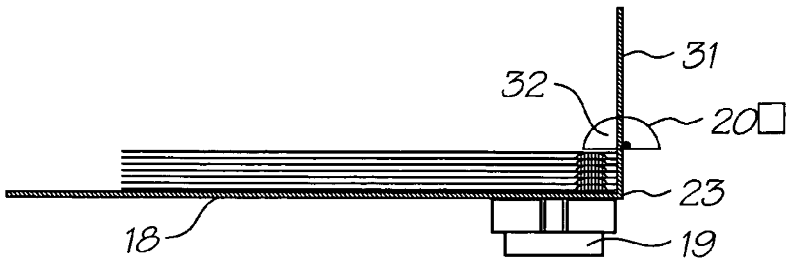
FIG. 20 is schematic elevational view of a page binding support tray having an alternative press.
Figure 21:
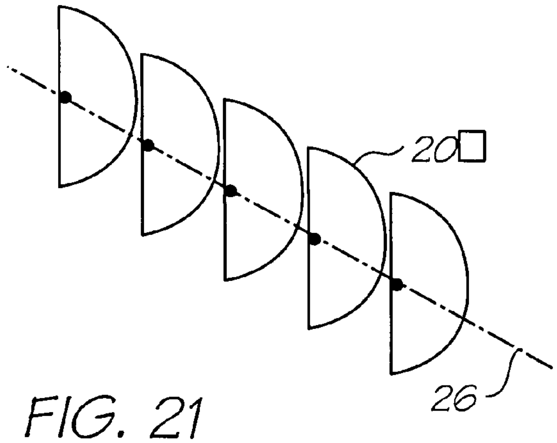
FIGS. 21 and 22 are schematic perspective views of a portion of the alternative press of FIG. 20.
Figure 22:
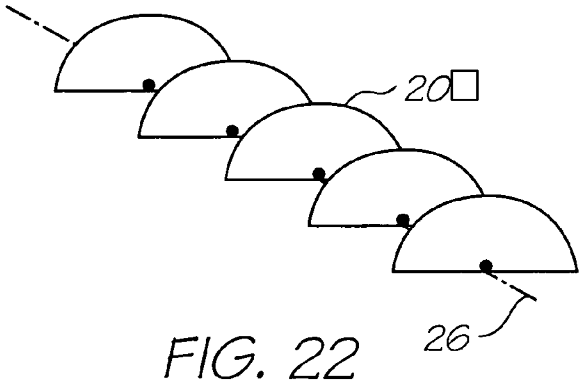

The binding press 20 is shown schematically in the Figures and could be pneumatically or hydraulically driven, or could be driven by other mechanical means such as rack and pinion, electrical solenoid or otherwise. An alternative embodiment as depicted in FIGS. 20, 21 and 22 incorporates a plurality of semicircular disks 20' each spaced apart, but fixedly mounted to a common rotatably driven shaft extending along an axis of rotation 26. Each disk 20 could pass through a respective vertical slot 33 formed in the end wall 31 of tray 18. That is, there would be as many vertical slots in wall 31 as there are disks 20. The disks could commence in the orientation depicted in FIG. 21 and upon rotation of the shaft pivot to the orientation depicted in FIGS. 20 and 22 so as to press down upon the pages.

The tray 18 might be provided with a floor of adjustable height so as to always present the top page in the tray closely to the pressing device. This would reduce noise levels by minimizing the stroke length of the binding press 20. Furthermore, the binding press 20 could be fixed and the tray could be pushed upwardly toward it to press and bind the pages.

Figure 23:
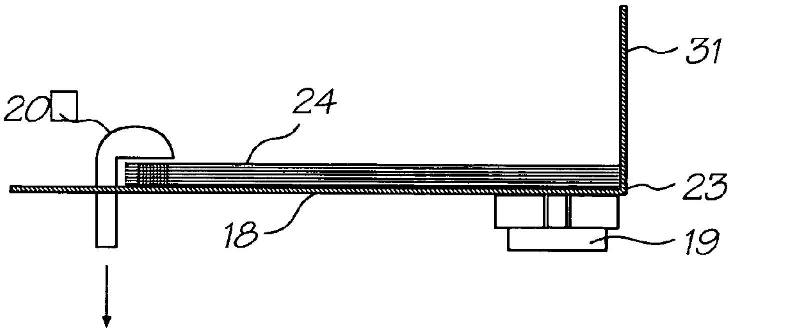
FIG. 23 is a schematic elevational view of a page binding support tray having an alternative press at a trailing edge of a stack of pages to be bound.

The floor of tray 18 can be driven so as to move downwardly as each page 11 is delivered thereto. This would ensure that the upper-most page always resided at the same level. This could result in reduced noise of movement of the press bar 20 as it need not move very far to effectively bind the pages.

Where the pages have applied thereto adhesive strips alongside the trailing edge 28, the press would be provided to the left as shown in FIG. 23. In this embodiment, a pressing bar 20" is provided. Any pressing arrangement could however be provided.

The invention claimed is:

1. A printing arrangement comprising:

a driving station configured to sequentially drive pages of print media along a path;

a printing station operatively arranged with respect to the path to print upon the sequentially driven pages of print media;

an adhesive application station operatively arranged with respect to the path to apply separate parts of a two-part adhesive to opposite sides of a leading or trailing edge of the pages of print media as the pages are being printed on by the printing station; and a binding station arranged to sequentially collect the printed pages of print media in a stack and press the stack to facilitate adhering of the printed pages of print media together.

2. A printing arrangement as claimed in claim 1, wherein the adhesive application station is located between the driving station and the printing station.

3. A printing arrangement as claimed in claim 1, wherein the driving station comprises a pair of opposed pinch rollers between which print media can be squeezed.

4. A printing arrangement as claimed in claim 1, wherein the printing station comprises a pair of opposed printheads between which print media can pass to be printed on opposite sides.

5. A printing arrangement as claimed in claim 1, wherein the adhesive application station comprises a pair of opposed adhesive applicators between which print media can pass to have the parts of the two-part adhesive applied to the opposite sides.

6. A printing arrangement as claimed in claim 1, wherein the printing station comprises either an inkjet printer or a laser printer.

7. A printing arrangement as claimed in claim 1, wherein the adhesive application station comprises either a spray applicator which can spray adhesive onto the print media or a contact applicator which can apply adhesive to the print media through contact.

8. A printing arrangement as claimed in claim 1, wherein the binding station comprises a tray in which the printed media can collect in the stack, and a press comprising a plurality of spaced semicircular disks which are each mounted to a common pivotal shaft which can be pivoted to press the stack.

* * * * *